(12) United States Patent
Kan et al.

(10) Patent No.: US 12,483,426 B2
(45) Date of Patent: Nov. 25, 2025

(54) METHOD FOR USING RFID TAGS AS CARRIERS FOR DIGITAL CALIBRATION CERTIFICATES AND ITS SYSTEM

(71) Applicant: National Institute of Metrology, China, Beijing (CN)

(72) Inventors: Kan Kan, Beijing (CN); XingChuang Xiong, Beijing (CN); Xiang Fang, Beijing (CN)

(73) Assignee: National Institute of Metrology, China, Beijing (CN)

( * ) Notice: Subject to any disclaimer, the term of this patent is extended or adjusted under 35 U.S.C. 154(b) by 230 days.

(21) Appl. No.: 18/530,693

(22) Filed: Dec. 6, 2023

(65) Prior Publication Data

US 2025/0158835 A1  May 15, 2025

(30) Foreign Application Priority Data

Nov. 13, 2023  (CN) .......................... 202311505359.X

(51) Int. Cl.
*H04L 9/32* (2006.01)
*G06K 7/10* (2006.01)

(52) U.S. Cl.
CPC ........ *H04L 9/3263* (2013.01); *G06K 7/10366* (2013.01)

(58) Field of Classification Search
CPC .... H04L 9/3263; G06K 7/10366; G06F 21/64
USPC ....................................................... 713/175
See application file for complete search history.

(56) References Cited

U.S. PATENT DOCUMENTS

| 11,170,385 B2 * | 11/2021 | Hong ...................... G06F 21/60 |
| 2008/0224823 A1 * | 9/2008 | Lawson .................. G06F 21/34 |
| | | 340/5.8 |
| 2009/0198541 A1 * | 8/2009 | Dolan .................. G06Q 10/087 |
| | | 705/29 |
| 2009/0198596 A1 * | 8/2009 | Dolan .................... G06Q 10/06 |
| | | 705/28 |

(Continued)

FOREIGN PATENT DOCUMENTS

| JP | 2006105808 A | * | 4/2006 | |
| WO | WO-2014106546 A1 | * | 7/2014 | .......... G06F 21/445 |
| WO | WO-2023212698 A1 | * | 11/2023 | .......... H04L 9/3278 |

*Primary Examiner* — Samson B Lemma
(74) *Attorney, Agent, or Firm* — MUNCY, GEISSLER, OLDS & LOWE, P.C.

(57) ABSTRACT

The present invention discloses a method for using RFID tags as carriers for digital calibration certificates and its system, which consists of following steps, i.e., generating standard DCC data; simplifying the DCC data to obtain the DCC-Lite data; after that, the DCC-Lite data is split into obtain multiple XML Lite files; and then, storing and writing multiple RFID tags in the multiple XML Lite files so that the DCC-Lite data can be spliced and restored by reading XML-Lite file information stored correspondence to the multiple RFID tags. The present invention realized unimpeded reading and application of instrument calibration information and data in the off-line state by means of simplifying, segmenting DCC files and storing them in multiple RFID tags respectively. Furthermore, the present invention may also split and store certain DCC-Lite with large amount of data in multiple RFID tags by splitting and splicing its content.

9 Claims, 5 Drawing Sheets

(56) References Cited

U.S. PATENT DOCUMENTS

2009/0283589 A1* 11/2009 Moore .................. H04L 9/3234
  235/382
2019/0370823 A1* 12/2019 Hong .................. G06Q 30/0185
2025/0045409 A1*  2/2025 Winn .................... G06F 21/575

* cited by examiner

METHOD FOR USING RFID TAGS AS CARRIERS FOR DIGITAL CALIBRATION CERTIFICATES AND ITS SYSTEM

FIELD OF THE INVENTION

The present invention relates to a kind of splicing technology of digital calibration certificates, especially, a method for using RFID tags as carriers for digital calibration certificates and its system.

BACKGROUND OF THE INVENTION

Nowadays, there are two types of forms, including in paper or in electronic form, are commonly applied to issue calibration certificates. The traditional reporting mode is in paper, which usually prints out calibration information and issues the certificate to customer. In this case, official seals or other physical means such as steel seals would be used for anti-counterfeiting. However, the paper-based certificate may cause a lot of inconvenience in terms of transmission and custody, and the printing and anti-counterfeiting measures applied would result in significant cost expenditures, making it more difficult to achieve machine readability and data accumulation.

Although the paper-based certificate is not machine readable for its lack of digitalization, the digital materials, including calibration certificates in electronic forms (PDF, Word, etc.), which are present in bit form, are also not machine readable since it is difficult to access such information by computers. DCC is characterized by machine readability since it applied the internationally recognized and approved exchange format XML (Extensible Markup Language). Meanwhile, digital signatures, digital seals, digital timestamps, and other measures are available as security measures to prevent counterfeiting and manipulation of calibration certificates. Furthermore, DCC can not only effectively solve the problem of unified format, but also create a computer-readable computable, and verifiable digital calibration certificate. In addition, DCC contains Administrative Data, Results of the Calibration, Comments, Documents, and Digital Signatures. Moreover, due to its numerous options and fewer restrictions, DCC may record statements, explanations, and other content for the purpose of satisfying the requirements of certification and recognition. As a result, the capacity of complete DCC could reach tens to hundreds of kb.

The traditional calibration certificate (whether in paper or electronic form), which is primarily readable by humans, is commonly used to serve as proof that the instrument can continue to be used by users. However, considering its lack of machine-readability, the application of the calibration data could be incomplete. Instead, the DCC is designed for machine readability, enabling the system or equipment itself to conveniently read calibration data curves. Further, it may complete self-compensation to its own measurement data according to the model. Meanwhile, a kind of accurate, safe and reliable calibration data provided by the DCC is conducive to reduce tolerance budget, so that it may realize complete application of the data of the calibration certificate and feedback it to the work site, and thus improves the value of the calibration certificate. In addition, with the development of Industry 4.0 and aided by DCC, the manufacturing control system can not only gather data information from on-site sensors, but also acquire quality information, including the uncertainty of these data, etc. Furthermore, the processed data would enhance the real-time interaction with the digital twin through data fusion and artificial intelligence algorithms, and thus enabling more effective utilization of measured values and quality information by the digital twin as well as reducing the gap between reality and the digital twin.

The future development direction of measurement instruments is to incorporate the DCC into the instrument, enable the transfer of DCC along with the instrument, and empower the instrument with the capability to process DCC itself. However, most existing measurement instruments lack the storage function themselves, let alone the processing ability of DCC. In the process of digital transformation in the manufacturing industry and the promotion of intelligent manufacturing, enterprises have generally constructed digital production systems, such as MES (Manufacturing Execution System) and QMS (Quality Management System), etc. After obtaining DCC, enterprises can store it in MES or QMS systems for the system to read and utilize the data. Furthermore, a correspondence with DCC would be created through the unique identification of the equipment. Although this method achieved unified management within the customer's internal system, it also determined that the DCC can only be used internally in the customer's system, which means that the DCC information of the measurement instrument is unavailable without this system. Furthermore, as it is required to meet the requirements of metrology technology accreditation and certification, a complete DCC is usually with a large capacity. However, the single chip capacity of existing RFID tags used in industry is insufficient to store complete DCC files. This renders it impossible to utilize DCC information in situations arising from security and other factors, such as network isolation, lack of network coverage, or when the transfer of DCC is required with the instrument. Thus, it is crucial to find a way to easily read and apply instrument calibration information and data without an internet connection, as well as can be transferred with the instrument conveniently. The method for using RFID tags as carriers for digital calibration certificates is preferred.

SUMMARY OF THE INVENTION

The purpose of the present invention is to provide a method for using RFID tags as carriers for digital calibration certificates and its system.

To achieve the above objectives, the present invention is implemented according to the following technical scheme:
The present invention consists of following steps:
A Generating standard DCC data;
B Simplifying the DCC data to obtain the DCC-Lite data;
C Splitting the DCC-Lite data into multiple XML Lite files;
D Storing and writing multiple RFID tags in the multiple XML Lite files so that the DCC-Lite data can be spliced and restored by reading XML-Lite file information stored correspondence to the multiple RFID tags.

Further, the specific steps for simplifying the aforesaid DCC data include:
(1) retaining the certificate number, the Begin Performance Date and the End Performance Date obtained from the administrativeData/coreData, as well as retaining the information elements necessary for the calibration laboratory and data from the administrativeData/calibrationLaboratory, and then deleting the remaining element data during processing administrative data;
(2) the certificates and the identification of the equipment for calibration stored in measurementResults/measurementResult, as well as keeping all results stored in measurementResults/measurementResult/results/, and then deleting the remaining element data during processing calibration results data;

(3) deleting comment information and the information of documents and digital signatures;

Further, the method for splitting the DCC-Lite data consists of:

Obtaining the capacity of DCC-Lite data and the capacity of a single RFID tag, then calculating the required number of RFID tags;

Adding start characters to the DCC-Lite data based upon a specific start character, then, the serial number of each tag should be incremented sequentially from 1, so that makes the character capacity between two start characters is equal to that of a single RFID tag;

Splitting the DCC-Lite data into multiple data blocks in order based upon taking the specific start character as a mark point, wherein, the specific start character is served as the beginning of each data block, meanwhile, such multiple data blocks are written in the corresponding RFID tags sequentially by utilizing an RFID reader-writer.

Further, the specific steps of the method for splicing and restoring the DCC-Lite data based upon the XML Lite file information include:

An RFID reader-writer is utilized to read the information of the RFID tags and then save them one by one to obtain the data blocks;

The data blocks which comply with a specific format should be filtered to obtain the serial numbers of the data blocks;

The data blocks are combined in ascending order according to the serial number of each tag, and then delete the specific start characters at the beginning of these data blocks. After that, such data blocks should be assembled into a complete DCC-Lite data.

Further, the specific format consists of the character "*" and the serial number of each tag.

Further, the character "*" and the serial number of each tag are utilized as a specific start character.

A construction system, which utilizes RFID tags as carriers for digital calibration certificates, consists of a computing information management system that should be utilized to generate standard DCC data, wherein, such computing information management system includes:

An RFID reader-writer, which should be utilized to read or write the DCC-Lite data;

An execution system, which should be utilized to store and write multiple RFID tags into multiple XML Lite files for splicing and restoring DCC-Lite data through reading the XML-Lite file information stored correspondence to the multiple RFID tags;

Further, there is a calibration system has been set on the computing information management system for verifying data.

The beneficial effects of the present invention are:

The present invention realized unimpeded reading and application of instrument calibration information and data in the off-line state by means of simplifying, segmenting DCC files and storing them in multiple RFID tags respectively. Furthermore, the present invention may also split and store certain DCC-Lite with large amount of data in multiple RFID tags by splitting and splicing its content, as well as re-assemble them into a complete DCC-Lite during reading.

DETAILED DESCRIPTION OF THE PREFERRED EMBODIMENTS

The text below provides a more detailed description of the present invention in conjunction with the accompanying drawings and specific embodiments. The schematic embodiments and explanations are used to explain it, but they are not intended as limitations of the present invention.

The present invention consists of following steps:

A Generating standard DCC data;

B Simplifying the DCC data to obtain the DCC-Lite data;

C Splitting the DCC-Lite data into multiple XML Lite files;

D Storing and writing multiple RFID tags in the multiple XML Lite files so that the DCC-Lite data can be spliced and restored by reading XML-Lite file information stored correspondence to the multiple RFID tags.

Figure 1:
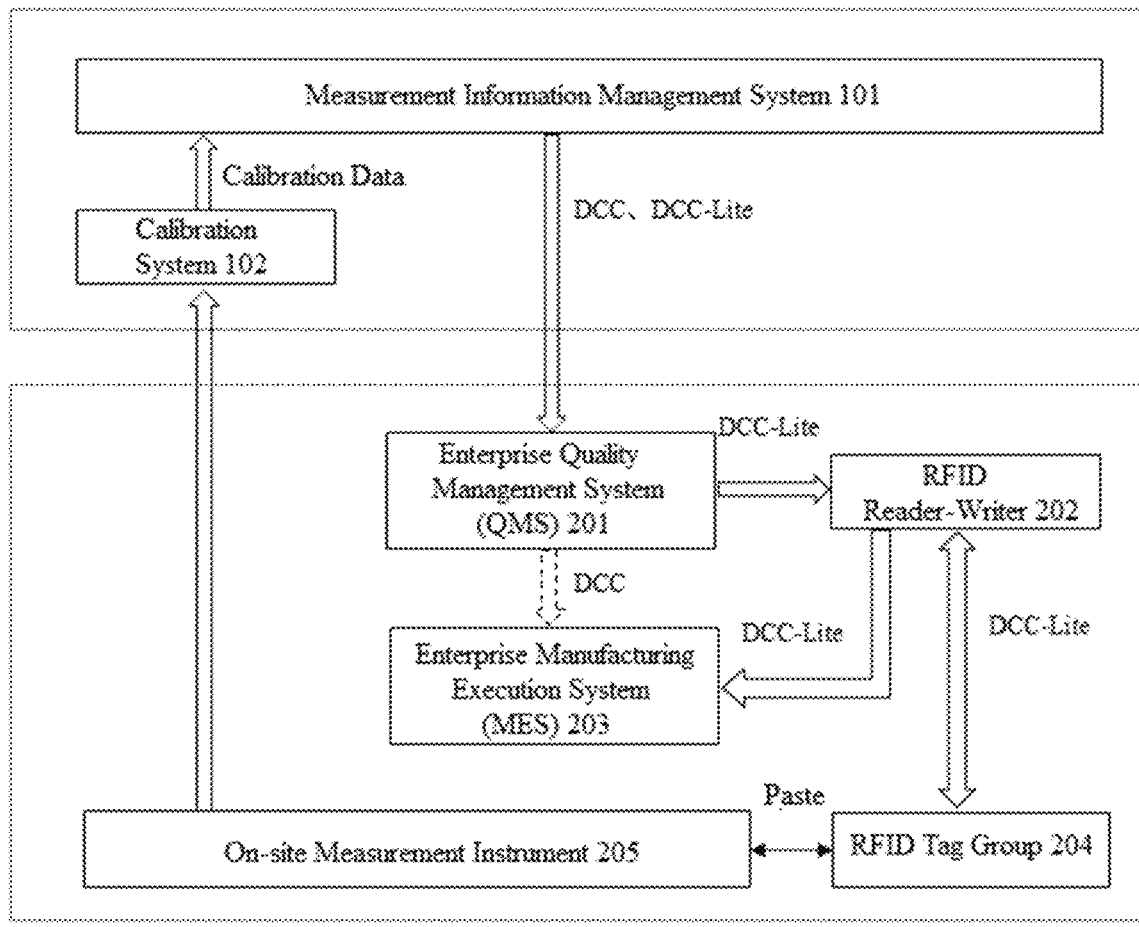
FIG. 1 illustrates a schematic diagram of a system utilizes Radio Frequency Identification (RFID) tags as storage carriers of (DCC) described in the present invention.

As shown in FIG. 1, which is a schematic diagram of a system utilizes Radio Frequency Identification (RFID) tags as storage carriers of (DCC), the overall functions of the system would be illustrated as follows:

To respond the calibration requirements of an enterprise, the institution of measurement technology completed the calibration of on-site Measurement instrument 205 via the Calibration System 102 according to corresponding calibration specifications and the requirements of certification and recognition, and issued a digital calibration certificate (DCC) and a lite-version digital calibration certificate (DCC Lite) via the Measurement Information Management System 101. The DCC and DCC-Lite were transmitted to the Enterprise Quality Management System (QMS) 201 via the Measurement Information Management System 101 in the manner of active push or passive call. In some cases, through negotiation and communication, the Measurement Information Management System 101 could also directly write the DCC-Lite into the RFID Tag Group 204 attached to the on-site Measurement Instrument 205 according to the agreed splitting rules.

The enterprise called DCC and DCC-Lite based upon business or instrument identification from the Measurement Information Management System 101 through the Enterprise Quality Management System (QMS) 201, or opened an interface to wait for the Measurement Information Management System 101 to actively push DCC and DCC-Lite. After the DCC and DCC-Lite had been obtained, the Enterprise Quality Management System (QMS) 201 wrote the DCC-Lite into the RFID Tag Group 204 of the on-site Measurement Instrument 205 through the RFID Reader-Writer 202 according to the agreed splitting rules. In the absence of network isolation between the Enterprise Manufacturing Execution System (MES) 203 and the Enterprise Quality Management System (QMS) 201, the Enterprise Quality Management System (QMS) 201 could also transmit DCC to the Enterprise Manufacturing Execution System (MES) 203. If it was necessary to apply calibration data, the DCC could be called directly under the condition that the demander of calibration data application could call the DCC through the network; otherwise, then the information in the RFID Tag Group 204 of the on-site Measurement Instrument 205 utilized for splicing was read by the RFID Reader-Writer 202 to obtain the DCC-Lite, and thus the calibration data was acquired.

Referring to the aforesaid embodiment, the way of simplifying the DCC to DCC Lite was as follows:

The existing complete DCC consisted of: (1) Administrative Data; (2) Results of the Calibration; (3) Comments; (4) Document; and (5) Digital signature. Since DCC should not only satisfy the requirements of standards and specifications of ISO/IEC 17025 and SI manuals, etc., but also consider the security requirements, a complete DCC consisted of more information than those in traditional paper-based certificates. For users of measurement instruments, calibration data was the most important information, and the calibrated measurement data was mainly gathered in (2) Results of the Calibration. Therefore, the metadata structure of DCC would be clipped to retain necessary calibration basic information and sufficient calibration data so as to convert the DCC into a smaller DDC-Lite for easy storage in RFID tags.

In this embodiment, the splitting, writing, and reading as well as splicing rules for DCC-Lite are as follows:

The splitting rules for DCC-Lite referred to: the number of tags sufficient to contain the RFID tag groups of the DCC-Lite could be calculated based on the capacity of a single RFID tag and the capacity of DCC-Lite. Wherein, start characters (with the serial number of each tags incremented from 1) were added to DCC-Lite, enabling the character capacity between the two start characters (including the previous start character) was equal to the capacity of a single RFID tag; Then, upon taking the start characters as the mark points split the DCC-Lite into multiple data blocks in order (it was required to guarantee that the start character should be utilized as the beginning of each data block), and thus the splitting of DCC-Lite was completed;

The reading and splicing rules for DCC-Lite referred to: the information of each RFID tag on the measurement instrument was read through the RFID reader-writer and saved one by one. After reading the information of all RFID tags, the serial number of each tag were extracted for reading the start character of each data block. Then, the data blocks should be combined in ascending order according to the serial number of each tag, and then the start characters, which were used as the beginning of these data blocks, should be deleted. After that, such data blocks would be spliced into the a complete DCC-Lite data, and thus the reading and splicing of DCC-Lite was completed.

Figure 2:
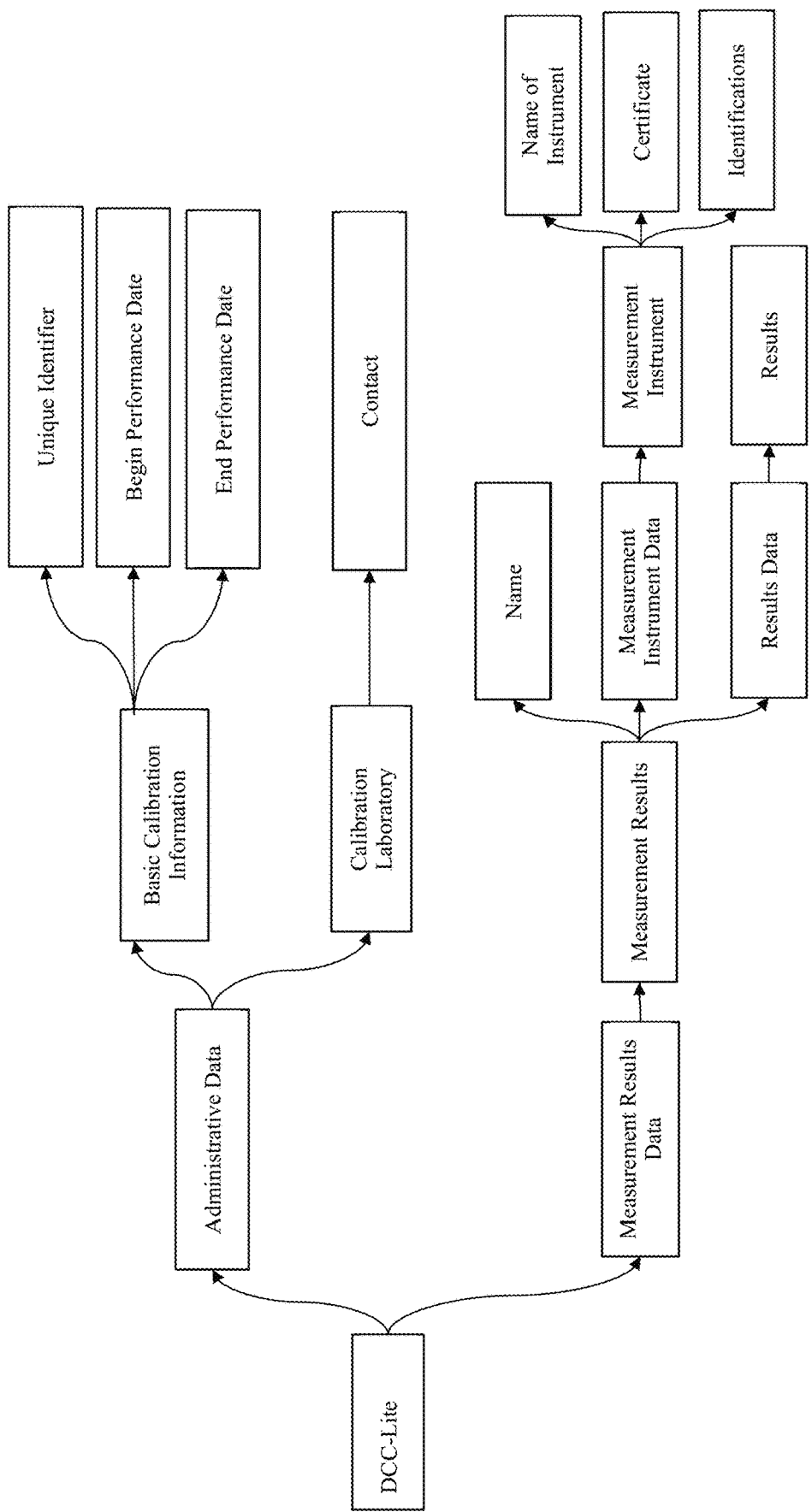
FIG. 2 illustrates a data structure diagram of the present invention for constructing the DCC-Lite.

As shown in FIG. 2, which is a data structure diagram of the present invention for constructing DCC-Lite, the DCC could be simplified into DCC-Lite according to the data structure diagram described in FIG. 2. The existing complete DCC consisted of: (1) Administrative Data; (2) Measurement Results; (3) Comments; (4) Document; and (5) Digital signature.

The calibrated measurement data was mainly gathered in the "calibration result data", and the existing DCC would be simplified according to the following requirements: (a) the unique identifier, the begin Performance Date, and the end Performance Date stored in the administrativeData/coreData should be retained, and the contact elements stored in administrativeData/calibrationLaboratory should be retained, then, deleted the remaining element data during processing the Administrative Data; (b) then, the name, certificate, and identification stored in the measurementResults/measurementResult should be retained, and all results stored in the measurementResults/measurementResult/results/ should be retained during processing the Measurement Results, after that, other element data were deleted; (c) deleted the Comments information; and (d) deleted the Document information; (e) as well as deleted the Digital Signature information. In addition, the DCC-Lite data structure table was shown in Table 1.

TABLE 1

DCC-Lite Data Structure Table
DCC-Lite Data Structure Table

| S/N | Route of Element Structure | Name of Element | Function/Description |
|---|---|---|---|
| 1 | administrativeData/coreData/uniqueIdentifier | uniqueIdentifier | Unique identifier of DCC |
| 2 | administrativeData/coreData/beginPerformanceDate | beginPerformanceDate | The date on which the calibration experiment began. |
| 3 | administrativeData/coreData/endPerformanceDate | endPerformanceDate | The date on which the calibration end |
| 4 | administrativeData/calibrationLaboratory/contact | contact | Contains all the information required by the calibration laboratory for calibrating the unique identification. |
| 5 | measurementResults/measurementResult/name | name | Designate the name of the calibration item. |
| 6 | measurementResults/measurementResult/measuringEquipments/ | name | Designate the name of the device after calibration |

TABLE 1-continued

DCC-Lite Data Structure Table
DCC-Lite Data Structure Table

| S/N | Route of Element Structure | Name of Element | Function/Description |
|---|---|---|---|
| 7 | measuringEquipment/name measurementResults/ measurementResult/ measuringEquipments/ measuringEquipment/ certificate | certificate | Designate the certificate of the device after calibration |
| 8 | measurementResults/ measurementResult/ measuringEquipments/ measuringEquipment/ identifications | identifications | To be used to identify equipment in different databases and enter in identifiers for different participants. |
| 9 | measurementResults/ measurementResult/results/ result | result | Calibration/measurement results |

Figure 3:
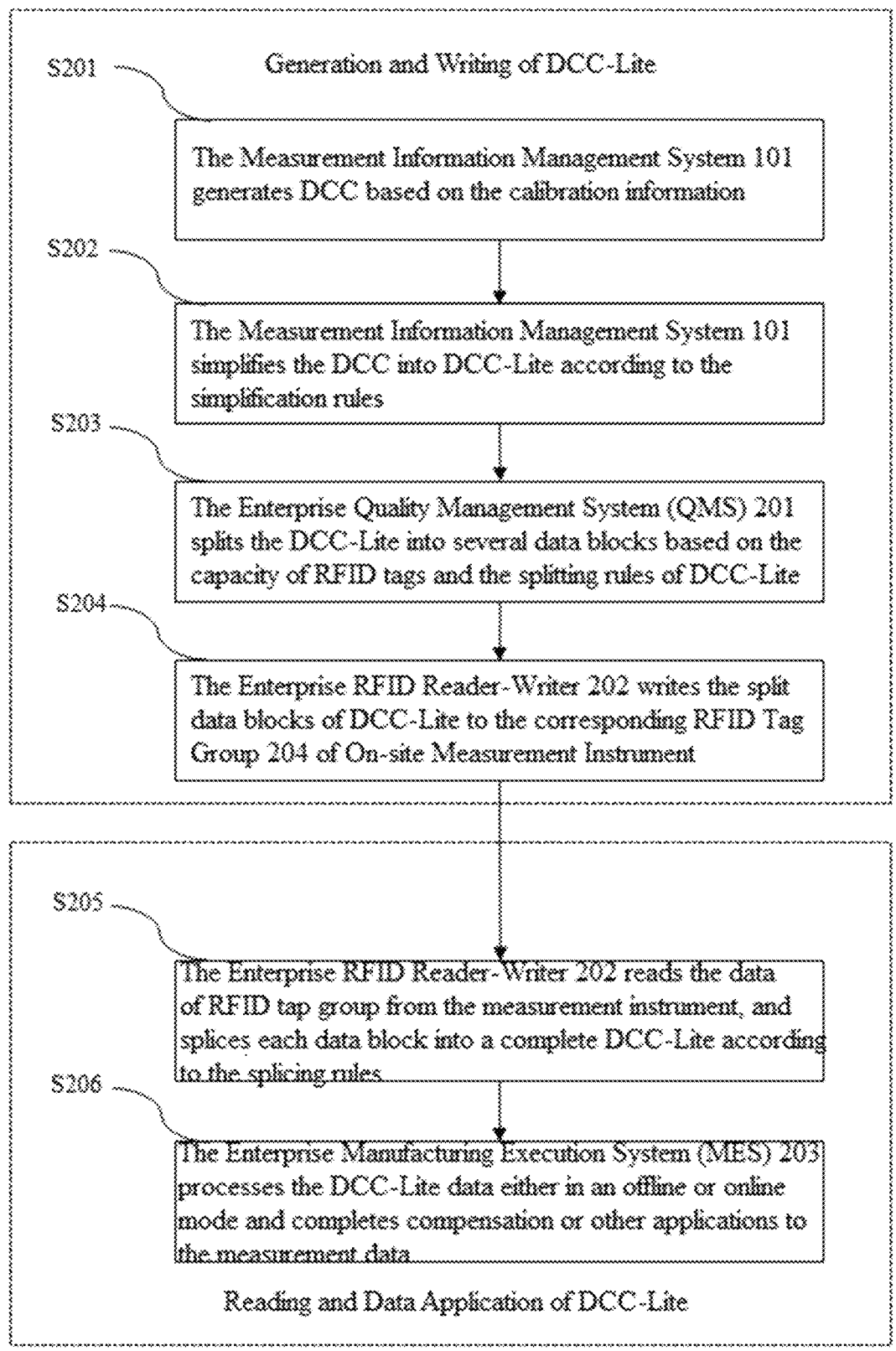
FIG. 3 illustrates a schematic diagram of the operation procedure of the present invention for writing the DCC-Lite into the RFID tag groups of the measurement instrument and reading and restoring DCC-Lite.

As shown in FIG. 3, which is a schematic diagram of the operation procedure of the present invention for writing the DCC-Lite into the RFID tag groups according to RFID tag parameters and reading the content of tag groups of the measurement instrument through the RFID reader-writer and splicing it into DCC-Lite during applying the calibration data; Referring to the FIG. 3, the specific procedures of the aforesaid process consisted of:

Step S201: The institution of measurement technology would calibrate the measurement instrument via the Calibration System 102 in accordance with relevant calibration specifications upon receiving a request from the enterprise to calibrate the On-site Measurement Instrument 205. After passing the corresponding verification and approval process, the calibration data generated would be verified through the Measurement Information Management System 101 based on the XML Scheme Definition of DCC.

Step S202: The Measurement Information Management System 101 converted the calibration data into the DCC in the XML format based on the DCC data structure, and the generated DCC generated the DCC-Lite in the XML format based on the DCC-Lite data structure.

Figure 4:
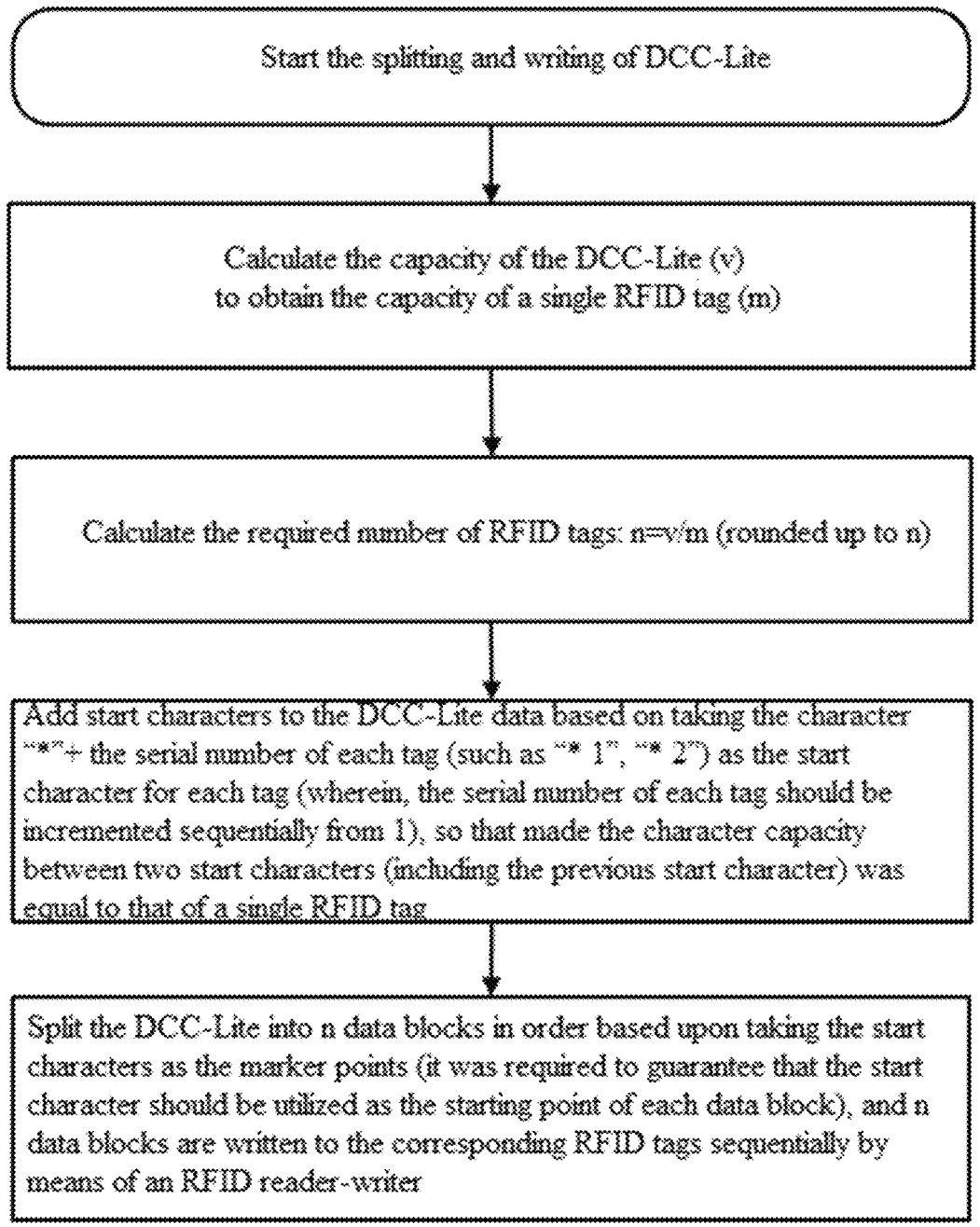
FIG. 4 illustrates an operational flowchart of the present invention for splitting DCC-Lite and writing the obtained data into RFID tag groups.

Step S203: The Measurement Information Management System 101 transmitted the DCC and DCC-Lite to the Enterprise Quality Management System (QMS) 201 through a push or passive call interface. Then, the DCC-Lite would be split based on the capacity of RFID tags and the splitting rules of DCC-Lite after the Enterprise Quality Management System (QMS) 201 received the DCC-Lite. Wherein, the splitting process was implemented as shown in FIG. 4.

Step S204: After the DCC-Lite had been split, the Enterprise Quality Management System (QMS) 201 would write the segmented data block to the RFID Tag Group 204 of the calibrated instrument through the RFID Reader-Writer 202 with manual operation, and thus the DCC-Lite had been split and written to the RFID Tag Group 204.

Figure 5:
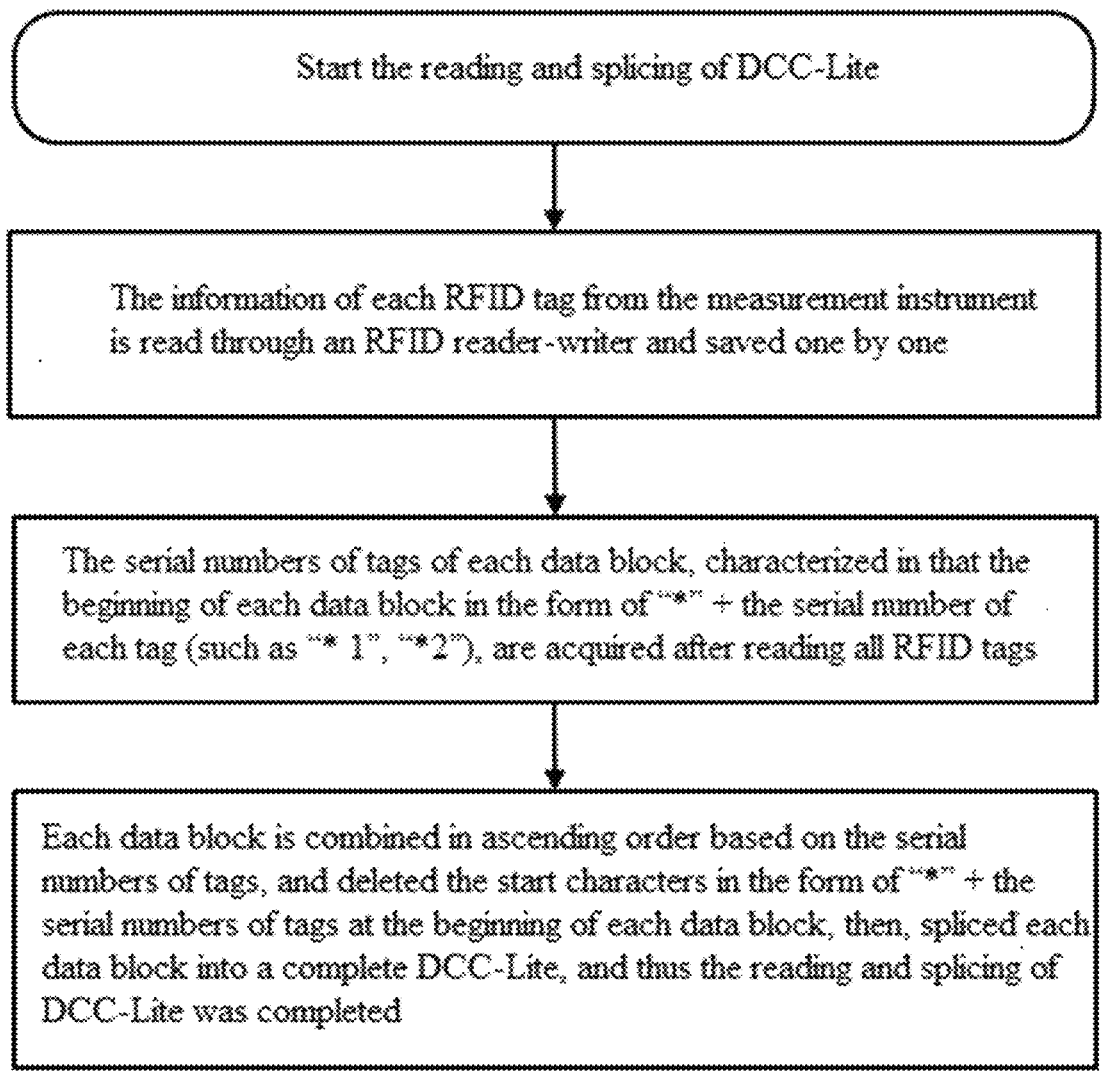
FIG. 5 illustrates an operational flowchart of the present invention for reading the RFID tag group data and splicing them into the DCC-Lite.

Step S205: The RFID Reader-Writer 202 was utilized to read the data of the RFID Tag Group 204 from the On-site Measurement Instrument 205 in case there was a need to read or apply calibration data by the On-site Measurement Instrument 205, then, the data would be transmitted to the Enterprise Manufacturing Execution System (MES) 203. After reading all the data of the RFID Tag Group 204, the Enterprise Manufacturing Execution System (MES) 203 would splice and recombine the data of each tag of the RFID Tag Group 204 into a complete DCC-Lite based on the reading and splicing rules of DCC-Lite. Wherein, the flow diagram of splicing was as shown in FIG. 5.

Step S206: The Enterprise Manufacturing Execution System (MES) 203 would process the calibration data in the offline mode (i.e., detached from the upper control system) after reading and splicing the data of each tag of the RFID Tag Group 204 into a complete DCC-Lite, to compensate, adjust the calibration information, or perform other applications based on such information. Furthermore, if necessary, the data of the RFID Tag Group 204 from the On-site Measurement Instrument 205 could also be read and applied through a manually held RFID Reader-Writer.

As shown in FIG. 4, i.e., an operational flowchart of the present invention for splitting DCC-Lite and writing the obtained data into RFID tag groups, which was utilized in step S203 of FIG. 3 consisted of following steps:

Calculated the capacity of the DCC-Lite (v) to obtain the capacity of a single RFID tag (m);

Calculated the required number of RFID tags: n=v/m (rounded up to n);

Added start characters to the DCC-Lite data based on taking the character "*"+the serial number of each tag (such as "* 1", "* 2") as the start character for each tag (wherein, the serial number of each tag should be incremented sequentially from 1), so that made the character capacity between two start characters (including the previous start character) was equal to that of a single RFID tag;

Split the DCC-Lite into n data blocks in order based upon taking the start characters as the mark points (it was required to guarantee that the start character should be utilized as the beginning of each data block), and n data blocks were written to the corresponding RFID tags sequentially through an RFID reader-writer, and thus the splitting of DCC-Lite was completed;

As shown in FIG. 5, which is an operational flowchart of the present invention for reading the RFID tag group data and splicing them into the DCC-Lite, which was utilized in step S205 of FIG. 3, consisted of following steps:

(1) The information of each RFID tag from the measurement instrument was read through an RFID reader-writer and saved one by one;

(2) The serial number of each tag of each data block, characterized in that the beginning of each data block was in the form of "*"+the serial number of each tag (such as "* 1", "* 2"), were acquired after reading all RFID tags;

(3) Each data block was combined in ascending order based on the serial number of each tag, and deleted the start characters in the form of "*"+the serial number of each tag at the beginning of each data block, then, spliced each data block into a complete DCC-Lite, and thus the reading and splicing of DCC-Lite was completed.

The technical scheme of the present invention is not limited to the limitations of the aforesaid specific embodiments. Any technical modifications developed based on the technical scheme of the present invention shall fall within the scope of protection of the present invention.

The invention claimed is:

1. A computer implemented method, implemented by one or more computer processors, for using RFID tags as carriers for (DCC) digital calibration certificates, the method comprising:
    generating, standard DCC data;
    simplifying the DCC data to obtain the DCC-Lite data;
    splitting the DCC-Lite data into multiple XML Lite files; and
    storing and writing multiple RFID tags, using one or more computer processors, in the multiple XML Lite files so that the DCC-Lite data can be spliced and restored by reading XML-Lite file information stored correspondence to the multiple RFID tags, wherein
    the step of simplifying the DCC data include:
    (1) retaining a certificate number, Begin Performance Date and End Performance Date obtained from administrativeData/coreData, as well as retaining necessary for calibration laboratory and data from the administrativeData/calibrationLaboratory, and then deleting remaining element data during processing administrative data;
    (2) certificates and identification of equipment for calibration stored in measurementResults/measurementResult, as well as keeping all results stored in measurementResults/measurementResult/results/, and then deleting the remaining element data during processing calibration results data; and
    (3) deleting comment information and information of documents and digital signatures.

2. The method for using RFID tags as carriers for digital calibration certificates according to claim 1, wherein the step of splitting the DCC-Lite data consists of:
    obtaining a capacity of the DCC-Lite data and the a capacity of a single RFID tag, then calculating a required number of RFID tags;
    adding start characters to the DCC-Lite data based upon a specific start character, then, incrementing a serial number of each tag sequentially from 1, so as to make a character capacity between two start characters is equal to that of a single RFID tag;
    splitting the DCC-Lite data into multiple data blocks in order based upon taking the specific start character as a mark point, wherein the specific start character is served as a beginning of each data block, meanwhile, such multiple data blocks are written in a corresponding RFID tags sequentially by utilizing an RFID reader-writer.

3. The method for using RFID tags as carriers for digital calibration certificates according to claim 1, wherein the step of splicing and restoring the DCC-Lite data based upon the XML Lite file information includes:
    utilizing an RFID reader-writer to read information of the RFID tags and then saving them one by one to obtain data blocks;
    filtering the data blocks which comply with a specific format to obtain the serial numbers of the data blocks;
    combining the data blocks in ascending order according to the serial number of each tag, and then deleting the specific start characters at the beginning of these data blocks; and
    assembling the data blocks into a complete DCC-Lite data.

4. The method for using RFID tags as carriers for digital calibration certificates according to claim 3, wherein the specific format consists of a character "*" and the serial number of each tag.

5. The method for using RFID tags as carriers for digital calibration certificates according to claim 2, wherein the character "*" and the serial number of each tag are utilized as a specific start character.

6. The method for using RFID tags as carriers for digital calibration certificates according to claim 3, wherein measurement data compensation is performed on the DCC-Lite data, which has been spliced, either in an offline or online mode.

7. The method for using RFID tags as carriers for digital calibration certificates according to claim 3, wherein the character "*" and the serial numbers of tags are utilized as the specific start character.

8. The construction system utilizes RFID tags as carriers for (DCC) digital calibration certificates, comprising a computing information management system that generates standard DCC data, including;
    one or more computer processors and a memory;
    an RFID reader-writer, which reads or writes DCC-Lite data;
    an execution system, which stores and writes multiple RFID tags into multiple XML Lite files for splicing and restoring the DCC-Lite data through reading XML-Lite file information stored in correspondence to the multiple RFID tags;
    a simplification system, which simplifies the DCC data to obtain the DCC-Lite data, splits the DCC-Lite data to obtain the multiple XML Lite files, and transmits the XML Lite files to the RFID reader-writer, wherein
    the simplification system simplifies the DCC data by:
    (1) retaining a certificate number, Begin Performance Date and End Performance Date obtained from administrativeData/coreData, as well as retaining necessary for calibration laboratory and data from the administrativeData/calibrationLaboratory, and then deleting remaining element data during processing administrative data;
    (2) certificates and d identification of equipment for calibration stored in measurementResults/measurementResult, as well as keeping all results stored in measurementResults/measurementResult/results/, and then deleting the remaining element data during processing calibration results data; and
    (3) deleting comment information and information of documents and digital signatures.

9. The method for using RFID tags as carriers for digital calibration certificates according to claim 8, wherein the computing information management system further includes a calibration system for verifying data.

* * * * *